United States Patent
Kawai et al.

(10) Patent No.: US 10,540,310 B2
(45) Date of Patent: *Jan. 21, 2020

(54) SELECTABLE PERIPHERAL LOGIC IN PROGRAMMABLE APPARATUS

(71) Applicant: International Business Machines Corporation, Armonk, NY (US)

(72) Inventors: Yutaka Kawai, Suginami (JP); Yohichi Miwa, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/378,984

(22) Filed: Apr. 9, 2019

(65) Prior Publication Data

US 2019/0220433 A1    Jul. 18, 2019

Related U.S. Application Data

(63) Continuation of application No. 15/594,942, filed on May 15, 2017, now Pat. No. 10,311,002.

(51) Int. Cl.
| | |
|---|---|
| *G06F 9/455* | (2018.01) |
| *G06F 13/38* | (2006.01) |
| *G06F 7/505* | (2006.01) |
| *G06F 15/78* | (2006.01) |
| *G06F 9/22* | (2006.01) |
| *G06F 13/12* | (2006.01) |

(52) U.S. Cl.
CPC .......... *G06F 13/387* (2013.01); *G06F 7/5057* (2013.01); *G06F 9/223* (2013.01); *G06F 13/124* (2013.01); *G06F 15/7892* (2013.01); *G06F 15/7867* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 6,531,889 B1 | 3/2003 | Leitch | |
| 9,294,097 B1 * | 3/2016 | Vassiliev | .......... H03K 19/17704 |
| 9,524,197 B2 * | 12/2016 | Dupont | ...................... G06F 9/46 |
| 10,061,731 B1 | 8/2018 | Kawai et al. | |
| 2003/0110306 A1 | 6/2003 | Bailis et al. | |

(Continued)

OTHER PUBLICATIONS

List of Patents or Patent Applications Treated as Related, dated Mar. 27, 2019, 2 pages.

(Continued)

*Primary Examiner* — Hyun Nam
(74) *Attorney, Agent, or Firm* — Scott S. Dobson

(57) ABSTRACT

A programmable apparatus for executing a function is disclosed. The programmable apparatus includes a physical interface configured to be connected with an external apparatus. The programmable apparatus also includes a function logic circuit configured to execute the function on the programmable apparatus. The programmable apparatus further includes a plurality of peripheral logic circuits, each of which is configured to connect the function logic circuit with the physical interface using a respective protocol. The programmable apparatus also includes a selector circuit configured to select one from among the plurality of the peripheral logic circuits to activate.

1 Claim, 8 Drawing Sheets

(56) References Cited

U.S. PATENT DOCUMENTS

| | | | |
|---|---|---|---|
| 2005/0138582 A1* | 6/2005 | So | G06F 17/5022 |
| | | | 714/30 |
| 2013/0346953 A1 | 12/2013 | Chen et al. | |
| 2016/0092484 A1* | 3/2016 | Finkler | G06F 16/2272 |
| | | | 707/715 |
| 2016/0148004 A1* | 5/2016 | Bakke | G06F 13/382 |
| | | | 726/29 |
| 2016/0217101 A1* | 7/2016 | Johns | G06F 9/44505 |
| 2018/0329847 A1 | 11/2018 | Kawai et al. | |

OTHER PUBLICATIONS

Kawai et al., "Selectable Peripheral Logic in Programmable Apparatus," U.S. Appl. No. 16/378,966, filed Apr. 9, 2019.
Accelerated Examination Support Document, dated Sep. 5, 2017, 16 pages.
Accelerated Examination Support Document, dated Mar. 13, 2019, 17 pages.
Kawai et al., "Selectable Peripheral Logic in Programmable Apparatus," U.S. Appl. No. 16/391,355, filed Apr. 23 2019.
List of Patents or Patent Applications Treated as Related, dated Apr. 22, 2019, 2 pages.

\* cited by examiner

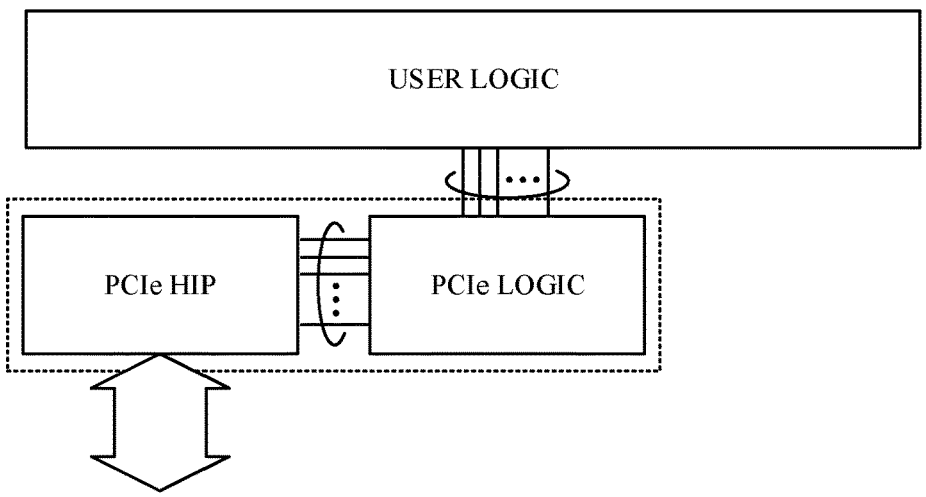
FIG. 2A
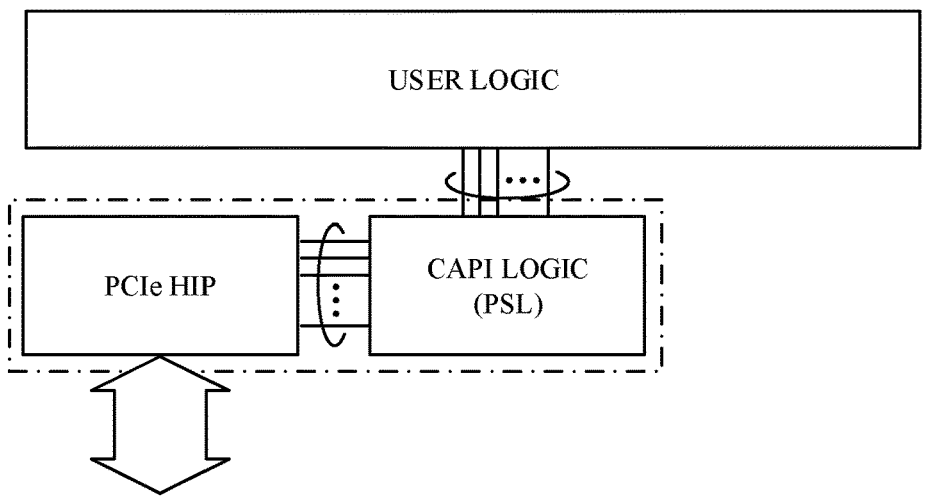
FIG. 2B
```
__kernel void vector_add(__global const float *a,
            __global const float *b,
            __global float *c)
{
  int i = get_global_id(0);
  c[i] = a[i] + b[i];
}
```
vector_add.cl
FIG. 2C

SELECTABLE PERIPHERAL LOGIC IN PROGRAMMABLE APPARATUS

BACKGROUND

The present disclosure, generally, relates to a programmable apparatus, more particularly, to technique for programmable apparatus that includes a physical interface and a function logic circuit.

Programmable apparatus such as Field Programmable Gate Array (FPGA) boards can be developed by using Hardware Description Language (HDL) such as Verilog. In developing user logic on the FPGA board with HDL, a user is required to design both of the user logic that the user wants to execute on the FPGA board and peripheral logic configured to connect the user logic with a physical interface of the FPGA board, separately. Since developing of the peripheral logic around the user logic is rather complex compared to designing the user logic itself, a large portion of workloads would be spent on development of the peripheral logic in some cases.

The FPGA boards can also be developed in Open Computing Language (OpenCL) framework, in which the peripheral logic can be synthesized automatically by simply describing a user algorithm in a high-level language such as C programming language. Regardless of its performance, OpenCL has been attracting attention in recent years due to its higher production efficiency than HDL from the viewpoint of time to market. A custom logic, whose implementation would take typically a few months by using HDL, can be implemented on the FPGA board within a few hours to a few days in the OpenCL framework.

Meanwhile, new techniques have emerged in relation to bus interfaces. For example, a mechanism has been developed for solving cache coherence in hardware on top of the PCIe (Peripheral Component Interconnect Express) protocol stack, which is known as CAPI (Coherent Accelerator Processor Interface).

In order to allow the peripheral logic to be synthesized automatically in the OpenCL framework, there is provided a data structure referred to as a board support package (BSP), which stores hardware information and peripheral logic particular to the FPGA board. Conventionally, a specific BSP for a specific protocol, which may be either PCIe or CAPI, would be used to develop the programmable device.

SUMMARY

According to an embodiment of the present invention there is provided a programmable apparatus for executing a function. The programmable apparatus includes a physical interface that is configured to be connected with an external apparatus. The programmable apparatus also includes a function logic circuit that is configured to execute the function on the programmable apparatus. The programmable apparatus further includes a plurality of peripheral logic circuits, each of which is configured to connect the function logic circuit with the physical interface using a respective protocol. The programmable apparatus further includes a selector circuit that is configured to select one peripheral logic circuit from among the plurality of the peripheral logic circuits to activate.

According to other embodiment of the present invention there is provided a data structure used for developing a function on a programmable apparatus that includes a physical interface. The data structure includes a peripheral logic design for a plurality of peripheral logic circuits on the programmable apparatus, each of which is configured to connect a function logic circuit on the programmable apparatus with the physical interface using a respective protocol. The data structure further includes a selector design for a selector circuit on the programmable apparatus. The selector circuit is configured to select one peripheral logic circuit from among the plurality of the peripheral logic circuits to activate.

According to further other embodiment of the present invention there is provided a method for developing a function on a programmable apparatus that includes a physical interface. The method includes reading a data structure that includes a peripheral logic design for a plurality of peripheral logic circuits and a selector design for a selector circuit on the programmable apparatus. The method additionally includes reading a code of high level language, which describes the function. The method further includes passing the code and the data structure to a compiler to generate configuration data that represents designs and internal states of elements in the programmable apparatus. The programmable apparatus is configured by the configuration data to have the plurality of the peripheral logic circuits, the selector circuit and a function logic circuit for executing the function. Each peripheral logic circuit is configured to connect the function logic circuit with the physical interface using a respective protocol. The selector circuit is configured to select one peripheral logic circuit from among the plurality of the peripheral logic circuits to activate.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

FIG. 2A illustrates a block diagram of a logic circuit on a FPGA based on a PCIe-based board support package;

FIG. 2B illustrates a block diagram of a logic circuit on the FPGA based on a CAPI-based board support package;

FIG. 2C depicts an example of a kernel code for the FPGA;

DETAILED DESCRIPTION

Now, the present invention will be described using particular embodiments, and the embodiments described hereafter are understood to be only referred to as examples and are not intended to limit the scope of the present invention.

One or more embodiments according to the present invention are directed to programmable apparatus, data structures used for developing a programmable apparatus and methods for developing a programmable apparatus.

Hereinafter, referring to a series of FIGS. 1-8, computing systems with an accelerator board, board support packages used for developing the accelerator boards, and processes for developing the accelerator boards according to one or more embodiments of the present invention will be described. More specifically, referring to a series of FIGS. 1-5, a computing system with an accelerator board, a board support package and process according to an exemplary embodiment of the present invention will be described. Then, referring to FIG. 6 and FIG. 7, accelerator boards according to two other exemplary embodiments of the present invention will be described. Finally, referring to FIG. 8, a hardware configuration of the computer system for developing the accelerator board according to one or more embodiments of the present invention will be described.

Figure 1:
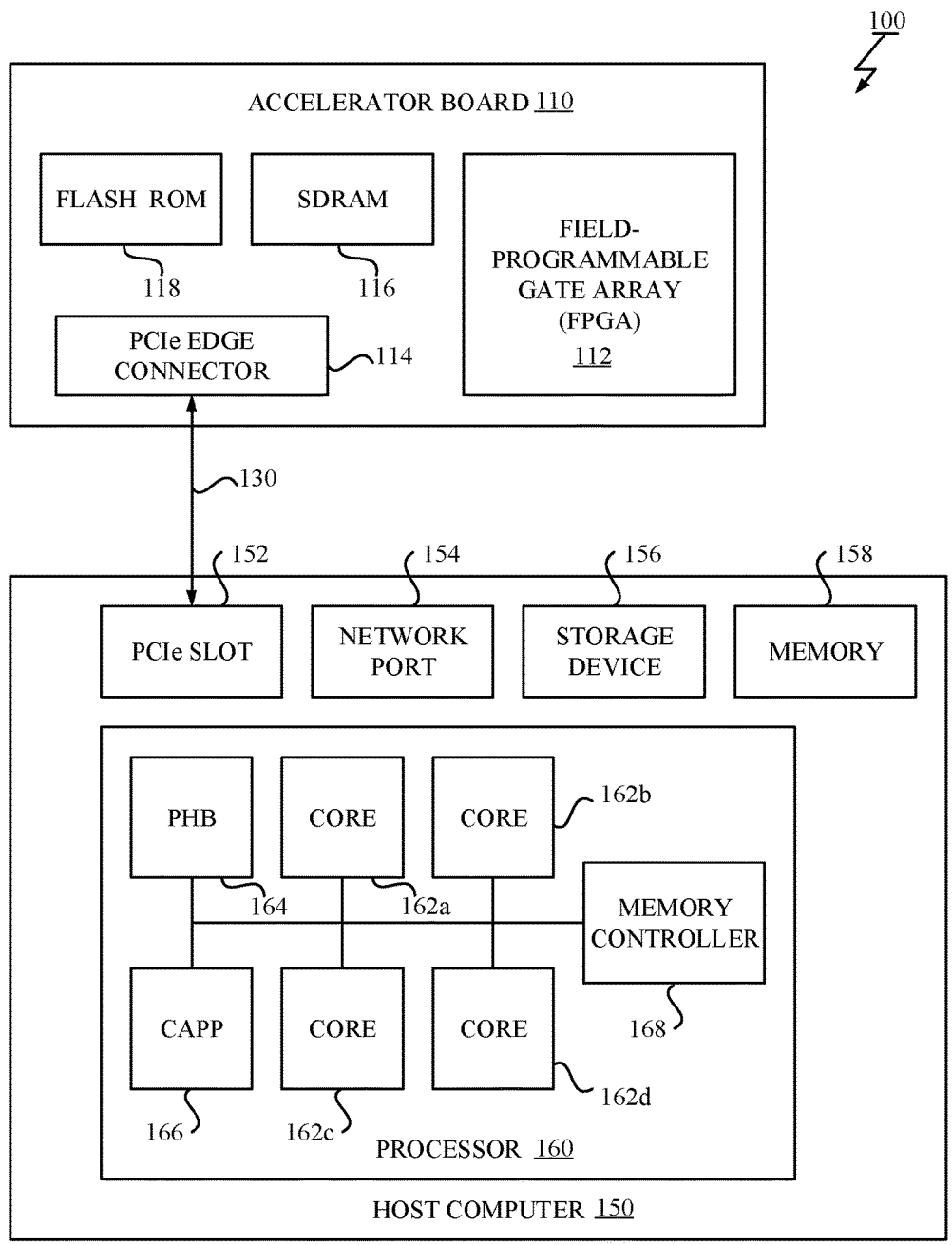
FIG. 1 describes a block diagram of a computing system that includes an accelerator board according to an exemplary embodiment of the present invention.

FIG. 1 describes a block diagram of a computing system 100 that includes an accelerator board 110 according to an exemplary embodiment of the present invention. As shown in FIG. 1, the computing system 100 may include the accelerator board 110 and a host computer 150 connected to the accelerator board 110 via a link 130.

In the FIG. 1, a hardware configuration of the accelerator board 110 is depicted. As shown in FIG. 1, the accelerator board 110 may include a FPGA (Field-Programmable Gate Array) 112, a PCIe edge connector 114, a SDRAM (Synchronous Dynamic Random-Access Memory) 116 and a flash memory 118.

The FPGA 112 is a programmable logic device that can be (re)configured by a user (i.e., logic developer) after manufacturing of a chip of the FPGA 112. The FPGA 112 includes an array of logic blocks and reconfigurable interconnects, which can be configured by using configuration data. The configuration data may be generated by an OpenCL compiler and transferred into the FPGA 112 from configuration ROM (Read Only Memory) or an external device.

The PCIe edge connector 114 is a physical interface of the PCIe protocol stack. The PCIe edge connector 114 is configured to be connected with an external apparatus such as the host computer 150 via the link 130. The PCIe edge connector 114 may be shared by multiple protocols including PCIe (Peripheral Component Interconnect Express) and CAPI (Coherent Accelerator Processor Interface) protocols.

The SDRAM 116 provides memory resources for the FPGA 112. The FPGA 112 can access data stored in the SDRAM 116. The flash ROM 118 provides a non-volatile memory resource, which may store configuration data for the FPGA 112.

In the FIG. 1, a hardware configuration of the host computer 150 is also depicted. As shown in FIG. 1, the host computer 150 may include a PCIe slot 152, a network port 154, a storage device 156, a memory 158 and a processor 160. The processor 160 may include one or more processor cores 162a-162d, a PCIe Host Bridge (PHB) 164, a CAPP (Coherent Accelerator Processor Proxy) 166 and a memory controller 168.

The processor cores 162a-162d is are processing units that execute specific processing in accordance with program instructions. Although there are four processor cores 162a-162d in the processor 160 shown in FIG. 1, the number of the processor cores may not be limited. The PHB 164 is a host bride for the PCIe that enables data transfers between the processor 160 and other PCIe based devices including the accelerator board 110. The CAPP 166 may be a host-side component of CAPI protocol, which maintains directory of cache lines held by the accelerator board 110. The CAPP 166 together with Power Service Layer (PSL) units, which are kernel-side components of CAPI and may be configured on the FPGA 112 of the accelerator board 110, acts as a cache directory so that the accelerator board 110 and the processor 160 can share the same coherent memory space. The CAPP 166 may be a part of the PHB 164. The memory controller 168 may manage data flow to and from the memory 158.

The PCIe slot 152 is a slot or edge connector socket to which an external apparatus such as the accelerator board 110 is attached by the PCIe edge connector. The network port 154 is a socket or connector for communicating with remote apparatus via a network such as Ethernet. The storage device 156 may store a computer program and data. The memory 158 may provide a main memory for the processor 160.

In the computing system 100 shown in FIG. 1, the host computer 150 can implement an application that sets up data and calls the accelerator board 110. The accelerator board 110 can implement an accelerator functional unit that reads and writes data across the PCIe bus and communicates with the application on the host computer 150. Host object code for the application on the host computer 150 and configuration data for the acceleration functional unit on the accelerator board 110 can be developed by using the OpenCL framework, in which the peripheral logic can be synthesized automatically by simply describing a user algorithm in a high-level language.

Although the custom logic may include not only the user logic configured to execute a user algorithm but also the peripheral logic configured to connect the user logic with the link 130 (i.e. PCIe edge connector 114), the peripheral logic may be hidden from the user logic and the available peripheral logic may be fixed. In developing the user logic on the accelerator board 110 in the OpenCL framework, the user is required to specify a specific board support package (BPS), which may be provided by a board vender of the accelerator board 110 or a manufacture of the FPGA 112.

The number of types of BSPs compatible with a specific accelerator board is not limited to one. For example, both of a PCIe-based BSP and a CAPI-based BSP may be prepared for an accelerator board that can support both of the PCIe and CAPI protocols. In this case, two different types of configuration data (FPGA image, bit stream, etc.) would be generated by changing the BSP while using the same user algorithm. However, merely single peripheral logic is applicable to the configuration data.

FIG. 2A and FIG. 2B illustrate block diagrams of logic circuits on an FPGA based on PCIe-based and CAPI-based BSPs, respectively. FIG. 2C depicts an example of a kernel code for the FPGA.

For example, to synthesize the kernel code shown in FIG. 2C for a specific accelerator board, which is equipped with an FPGA provided by Altera Corporation®, a following command may be issued for the synthesis, where a specific PCIe-based BSP named "xxxx_hpc_xx" is specified by a --board option and an FPGA image file called "vector_add.aocx" is generated as an output (-o):

aoc vector_add.cl --board xxxx_hpc_xx -o vector_add.aocx

For example, to generate an FPGA image compatible with CAPI protocol by using same kernel code shown in FIG. 2C, a following command may be issued for the synthesis, where a specific CAPI-based BSP named "xxx_xx_capi" is specified by a --board option and an FPGA image file called "vector_add_capi.aocx" is generated as an output (-o):

aoc vector_add.cl --board xxx_xx_capi -o vector_add_capi.aocx

As shown in FIG. 2A and FIG. 2B, after being configured by using the FPGA image file generated from the specific BSP, the logic circuits on the FPGA may have a single peripheral logic circuit (which is surrounded by a dashed line or a long dashed short dashed line in FIGS. 2A and 2B, respectively) around the user logic circuit. Detail about the peripheral logic circuit will be described later.

In viewing of the kernel code shown in FIG. 2C, the kernel code includes merely description of user logic itself. As for the peripheral logic, changing variable declarations in the kernel code can merely adjust a memory layout and I/O transfer in some extent, however, which does not transform the logic itself.

Depending on differences in applications and workloads, overall performance would be affected by characteristics of a bus interface that includes the peripheral logic circuit. Therefore, there may be need for switching among multiple peripheral logic circuits to be used on the accelerator board.

According to the present embodiment, whole logic circuits generated for a certain user algorithm are divided into two groups, including a group of the user logic circuit that corresponds to the user algorithm itself and a group of the peripheral logic circuit that is configured to connect the user logic circuit with the bus interface. Then, plurality of the peripheral logic circuits for respective protocols is provided and configured to be selectable in the single accelerator board 110.

As illustrated in FIG. 2A and FIG. 2B, portions related to the PCIe hard intellectual property block (hereinafter "HIP") may differ between the two BSPs, while remaining the configuration of the remaining portions remain the same or equal. The PCIe HIP is included in both of the PCIe-based and CAPI-based BSPs. The standard PCIe logic is used in the PCIe-based BSP while the PSL is used in the CAPI-based BSP.

Figure 3:
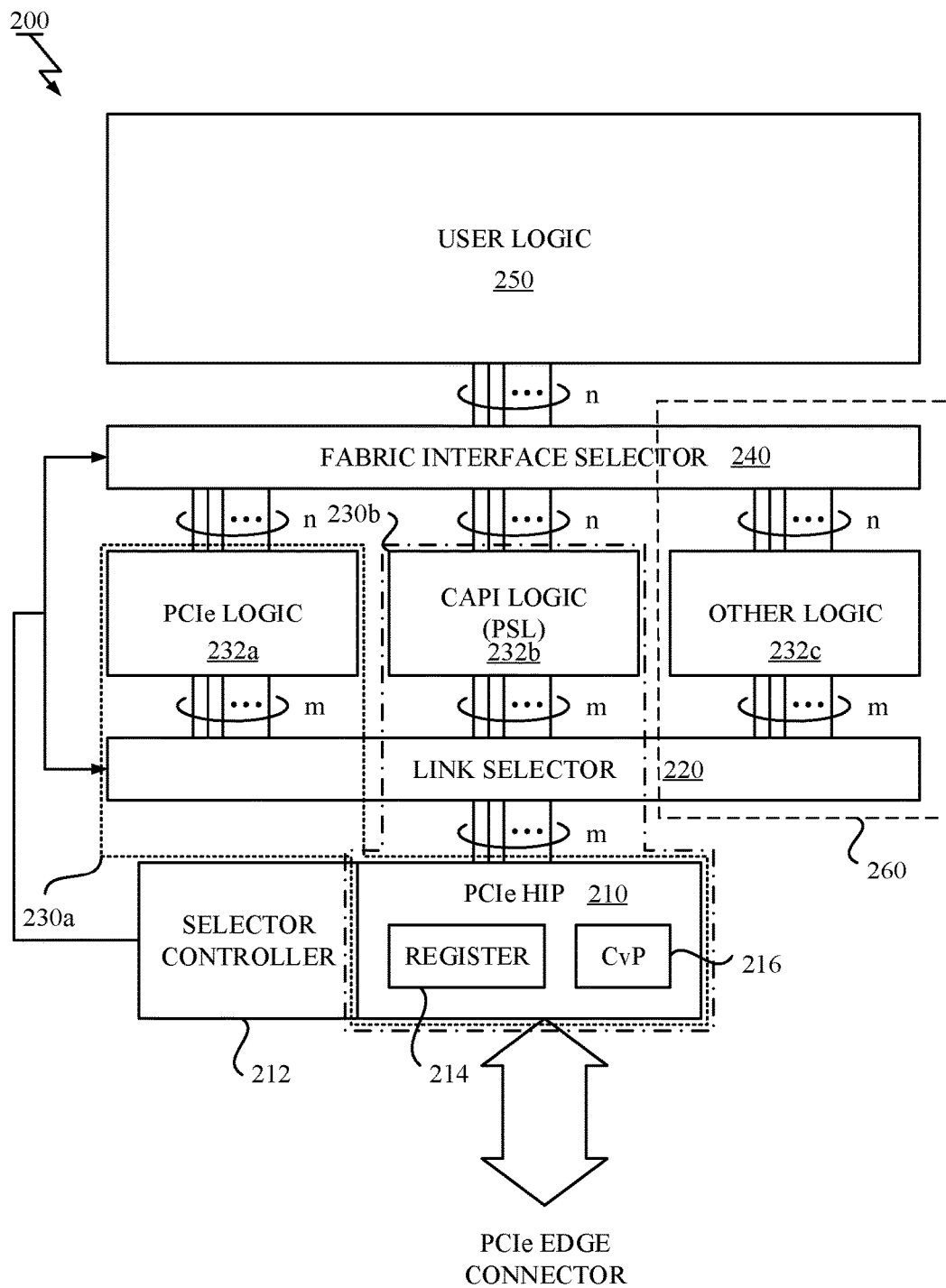
FIG. 3 illustrates a block diagram of a logic circuit on the FPGA based on a novel board support package, which includes designs for a plurality of peripheral logic circuits of multiple protocols according to the exemplary embodiment of the present invention.

In the light of aforementioned consideration, according to the exemplary embodiment, the accelerator board 110 with a novel logic circuit design is provided. FIG. 3 illustrates a block diagram of a logic circuit on the FPGA 112 (FIG. 1) based on a novel BSP, which includes designs for a plurality of peripheral logic circuits for multiple protocols.

The logic circuit 200 of the accelerator board 110 (FIG. 1) may be configured by using the configuration data that is based on the novel BSP. As shown in FIG. 3, the logic circuit 200 includes a user logic circuit 250, a plurality of peripheral logic circuits (230a, 230b) and a set of selector circuits (212, 220 and 240). Since additional components for an alternative embodiment is surrounded by a dashed line 260, the number of the peripheral logic circuits is two in the described embodiment.

The user logic circuit 250 is configured to execute a user function that the user wants to execute on the accelerator board 110. In a particular embodiment, the user function may be a kernel for the accelerator functional unit. Each peripheral logic circuit 230a and 230b is configured to connect the user logic circuit 250 with the PCIe edge connector 114 (FIG. 1) using a respective protocol. In the described embodiment, there are two peripheral logic circuits including a PCIe peripheral logic circuit 230a (which is surrounded by a dashed line) and a CAPI peripheral logic circuit 230b (which is surrounded by a long dashed short dashed line).

As shown in FIG. 3, the logic circuit 200 of the accelerator board 110 may include a PCIe HIP block 210 connected to the PCIe edge connector 114. The PCIe HIP block 210 may have a PCIe protocol stack including transaction, data link and physical layers, which may be hardened in the FPGA 112. The PCIe HIP block 210 may be shared by the plurality of the peripheral logic circuits 230a and 230b.

There is remaining logic circuit 232a, 232b and 232c other than the PCIe HIP 210 for each peripheral logic circuit 230. The remaining logic circuit 232a, 232b, and 232c may include, but not limited to, any combination of a memory interface (PHY) and a memory controller for on-board memory, a direct memory access (DMA) engine, a bridge for master-slave connections, a service layer, a translator for the service layer, a phase locked loop, a request sequencer, etc. The remaining PCIe logic circuit 232a may include any logic circuits other than the PCIe HIP 210, which is used for achieving a connection between the user logic circuit 250 and the PCIe edge connector 114 using standard PCIe protocol. The remaining CAPI logic circuit 232b may include the PSL and any logic circuits other than the PCIe HIP 210, which is used for achieving a connection between the user logic circuit 250 and the PCIe edge connector 114 using the CAPI protocol.

The selector circuits are configured to select one peripheral logic circuit 230 from among the plurality of the peripheral logic circuits 230a and 230b to activate. The selector circuits may include a selector controller 212, a link selector 220 and a fabric interface selector 240.

The link selector 220 may be disposed between the PCIe HIP 210 and the logic circuits 232a and 232b of the peripheral logic circuits 230a and 230b. The link selector 220 may be configured to connect the PCIe edge connector 114 with one selected from among the peripheral logic circuits 230a and 230b. The link selector 220 may select a physical line (PCIe link) used to connect to the PCIe HIP 210.

The fabric interface selector 240 may be disposed between the user logic circuit 250 and the logic circuits 232a and 232b of the peripheral logic circuits 230a and 230b. The fabric interface selector 240 may be configured to connect the user logic circuit 250 with one selected from among the peripheral logic circuits 230. The fabric interface selector 240 may select a physical line (FPGA fabric interface) used to connect to the user logic circuit 250.

The selector controller 212 may be configured to control states of the link selector 220 and the fabric interface selector 240 based on a predetermined setting parameter. In the described embodiment, the selector controller 212 is attached to the PCIe HIP 216 as illustrated in FIG. 3.

Since the peripheral logic circuits 230 are hidden from the user logic circuit 250, input signals to the selector controller 212 can be preferably handled based on a hard IP (e.g., HIP). In the described embodiment, since the PCIe HIP 210 is used in common, signals can be sent using the PCIe HIP 210 in switching between PCIe and CAPI protocols. The PCIe HIP 210 may include a register 214 that holds a value of a setting parameter. The value of the setting parameter held in the register 214 may be configured through the PCIe edge connector 114 by a Configuration via Protocol (CvP) 216.

In the case of specific PCIe HIP provided by Altera Corporation®, Altera-Defined Vendor Specific Extended Capability® (VSEC) is available and reconfiguration of pin assignments is allowed. VSEC registers may include CvP mode control register and CvP data registers. High-order 16 bits of the CvP mode control register are unused and can be used as a control register of the selector controller 212 that holds the setting parameter while the CvP data register can be used as a data register of the selector controller 212.

In the exemplary embodiment, the physical interface is a connector of a PCIe and there are the PCIe peripheral logic circuit 230a and the CAPI peripheral logic circuit 230b. However, specific protocols to which the present technique is applicable may not be limited to the aforementioned examples (e.g. PCIe and CAPI) and the number of the peripheral logic circuits and their protocols is not limited to two.

As shown in FIG. 3 by the dashed line 260, a block diagram of logic circuits on the FPGA based on an alternative BSP is also described. In alternative embodiments, there may be more than two peripheral logic circuits and corresponding protocols. As shown in FIG. 3, the logic circuits on the FPGA according to the alternative embodiment may further include a logic circuit 232c for other protocol, which also constitutes an additional peripheral logic circuit together with the PCIe HIP block 210, in addition to the PCIe and CAPI logic circuits 232a, 232b. Furthermore, the logic circuits on the FPGA according to other alternative embodiment may include the logic circuit for other protocol, in place of either one of the PCIe and CAPI logic circuits 232a, 232b.

With respect to the applicable protocols, the present technique can be applied to any combination of known protocols that are capable of running on top of a link of the physical interface commonly. For example, the physical interface may be a connector of a BlueLink, the plurality of the peripheral logic circuits may include a peripheral logic circuit for OpenCAPI protocol and a peripheral logic circuit for a NVLink protocol, both of which are capable of running on the top of the BlueLink physical interface.

Furthermore, in the described embodiment, the programmable apparatus may be a circuit board including the FPGA 112 and the PCIe edge connector 114. Also the user logic circuit 250 implements a kernel corresponding to a host application on the host computer 150. Furthermore, the user logic circuit 250, the plurality of the peripheral logic circuits 230 and the selector circuits (212, 220, 230) may be implemented at least in part by using logic blocks of the FPGA 112. However, any known programmable apparatus including reconfigurable units and a physical interface can be used as programmable apparatus.

Figure 4:
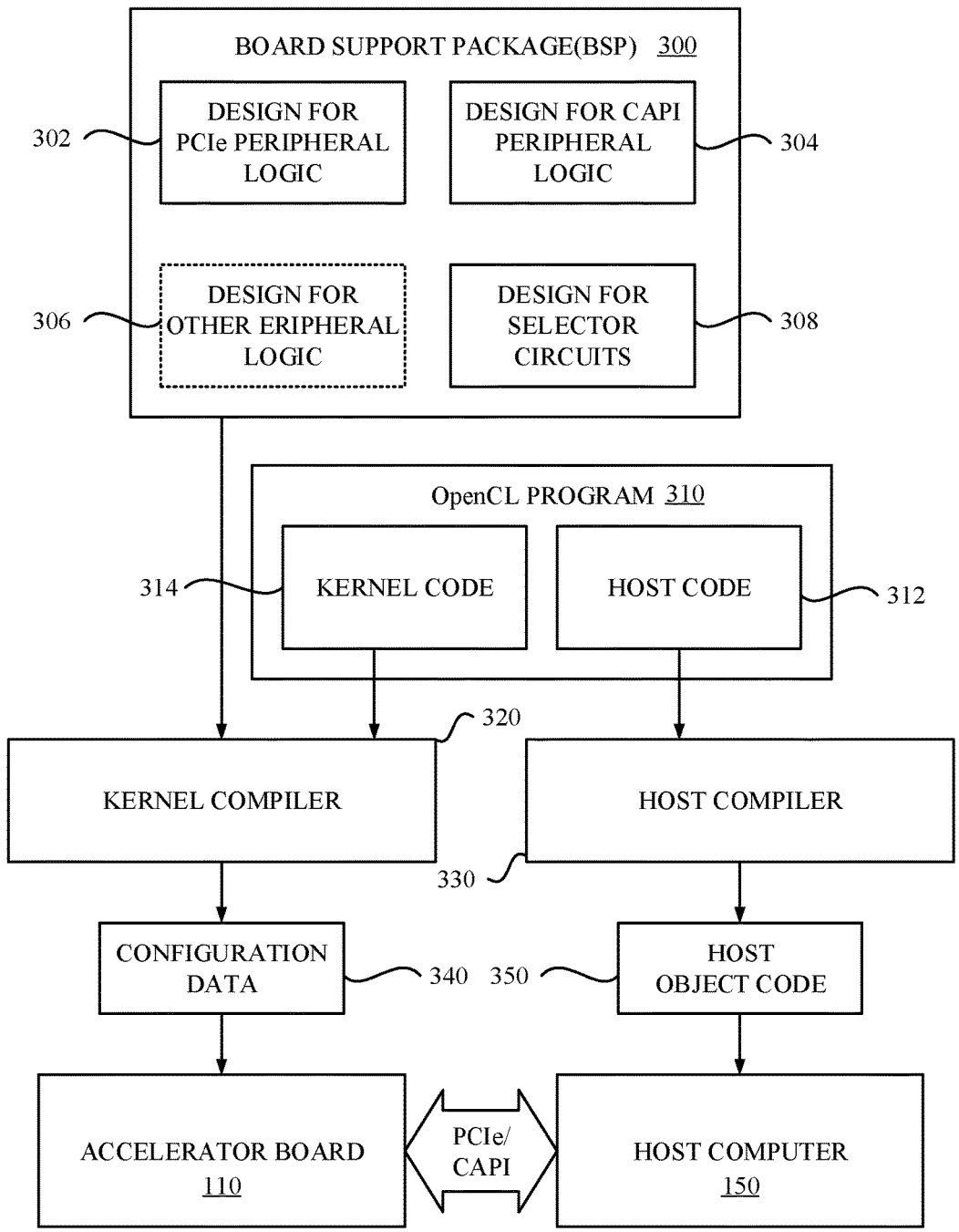
FIG. 4 illustrates a block diagram of a computer system for developing the accelerator board according to the exemplary embodiment of the present invention.
Figure 5:
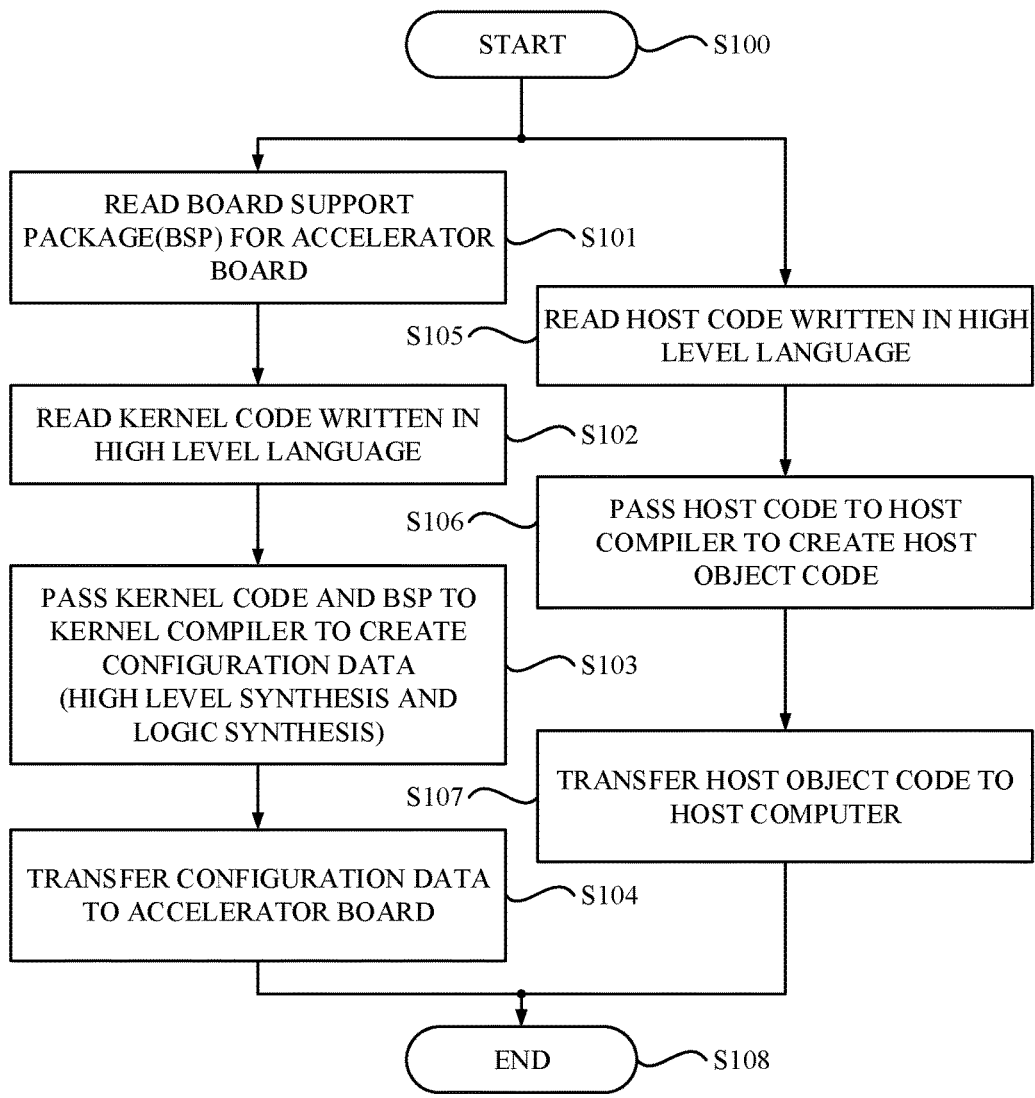
FIG. 5 is a flowchart depicting a process for developing the accelerator board according to the exemplary embodiment of the present invention.

Referring to FIG. 4 and FIG. 5, data structure of the novel BSP and the process for developing the accelerator board 110 by using the novel BSP will be described. FIG. 4 illustrates a block diagram of a computer system for developing the accelerator board 110 with a schematic date structure of the novel BSP 300.

As shown in FIG. 4, the BSP 300 may include peripheral logic designs for the plurality of the peripheral logic circuits 230 and selector designs 308 for the selector circuits (212, 220, 240). In the described embodiment, the peripheral logic designs include a design 302 for the PCIe peripheral logic circuit 230a and a design 304 for the CAPI peripheral logic circuit 230b. In an alternative embodiment, a design 306 for the other peripheral logic circuit may be included in the BSP 300 as shown in FIG. 4 by a dot line.

The design 302 for the PCIe peripheral logic circuit 230a may include a part of the PCIe-based BSP, which can be extracted from the PCIe-based BSP as non-intersectional part between the PCIe-based BSP and the CAPI-based BSP. The design 304 for the CAPI peripheral logic circuit 230b may include a part of the CAPI-based BSP, which can be extracted from the CAPI-based BSP as a non-intersectional part between the PCIe-based BSP and the CAPI-based BSP. The BSP 300 may also include an intersectional part between the PCIe-based BSP and the CAPI-based BSP, which may defines a user space to which the user logic circuit 250 would be configured (not shown in FIG. 4).

The selector design 308 may include a selector controller design that defines the selector controller 212, a link selector design that defines the link selector 220 and a fabric interface selector design that defines the fabric interface selector 240.

In order to perform parallel computation, the user may write OpenCL program 310, which may include a host code 312 and a kernel code 314 written in the high-level programming language such as C programming language.

To synthesize the user logic for the specific accelerator board, the user would issue a command that specifies the BSP and the kernel code 314 to call a kernel compiler 320. The kernel compiler 320 may be any known compiler included in development environment for FPGAs, including Altera® SDK for OpenCL, Xilinx® SDAccel, to name but a few. The kernel compiler 320 performs high-level synthesis and logic synthesis based on the given kernel code 314 and the given BSP 300 to generate the configuration data 340. The user would also issue a command that specifies the host code 312 to call a host compiler 330. The host compiler 330 may be any known available compiler. The host compiler 330 performs compilation of the host code to generate the host object code 350.

In this manner, the application that sets up data and calls the accelerator board 110 can be implemented on the host computer 150. The accelerator functional unit that reads and writes data across the bus interface and communicates with the application on the host computer 150 can be implemented on the accelerator board 110. During the computation, the host computer 150 and the accelerator board 110 would communicate with each other through either PCIe or CAPI protocol in a manner that depends on the value of the setting parameter.

FIG. 5 is a flowchart depicting a process executed by the computer system for developing user logic on the accelerator board 110. The process shown in FIG. 5 may be performed by a processing unit of the computer system to which the kernel and host compilers 320, 330 are installed. The process may begin at step S100 in response to a command for compiling the program 310 including the host code 312 and the kernel code 314.

At step S101, the processing unit may read the given BSP 300 for the accelerator board 110. At step S102, the processing unit may read the given kernel code 314, which describes the user algorithm written in high level language such.

At step S103, the processing unit may pass the kernel code 314 and the BSP 300 into the kernel compiler 320 to create the configuration data 340, which represents designs and internal states of elements in the FPGA 112. During the compilation, the high level synthesis and the logic synthesis may be executed. At step S104, the processing unit may transfer the configuration data to the accelerator board 110.

After being configured by using the configuration data, the accelerator board 110 would be configured to have the user logic circuit 250, the plurality of the selectable peripheral logic circuits 230 and the selector circuits (212, 220, 240) on its FPGA 112.

In parallel to the process form the step 101 to the step S104, the processing unit may perform the process from step S105 to step S107. At step S105, the processing unit may read the given host code 312. At step S106, the processing unit may pass the host code 312 into the host compiler 330 to create the host object code 350. At step S107, the processing unit may transfer the host object code 350 to the host computer 150.

In FIG. 5, both of the kernel code compilation and the host code compilation are performed by the processing unit of the computer system other than the host computer 150. However, the host computer 150 can perform the kernel code compilation and the host code compilation. Also, the kernel code compilation and the host code compilation may be performed by different processing units.

According to the exemplary embodiment, the user can switch among multiple peripheral logic circuits 230 to be used on the accelerator board 110 by setting the setting parameter.

In viewing of overall performance and power consumption, the user can select an optimal bus interface among the available type of the interfaces including the PCIe and CAPI. Also, end user can switch the bus interface in response to changing the host computer from one architecture to other architecture.

Hereinafter, referring to FIGS. 6 and 7, accelerator boards according to other exemplary embodiments of the present invention will be described.

Figure 6:
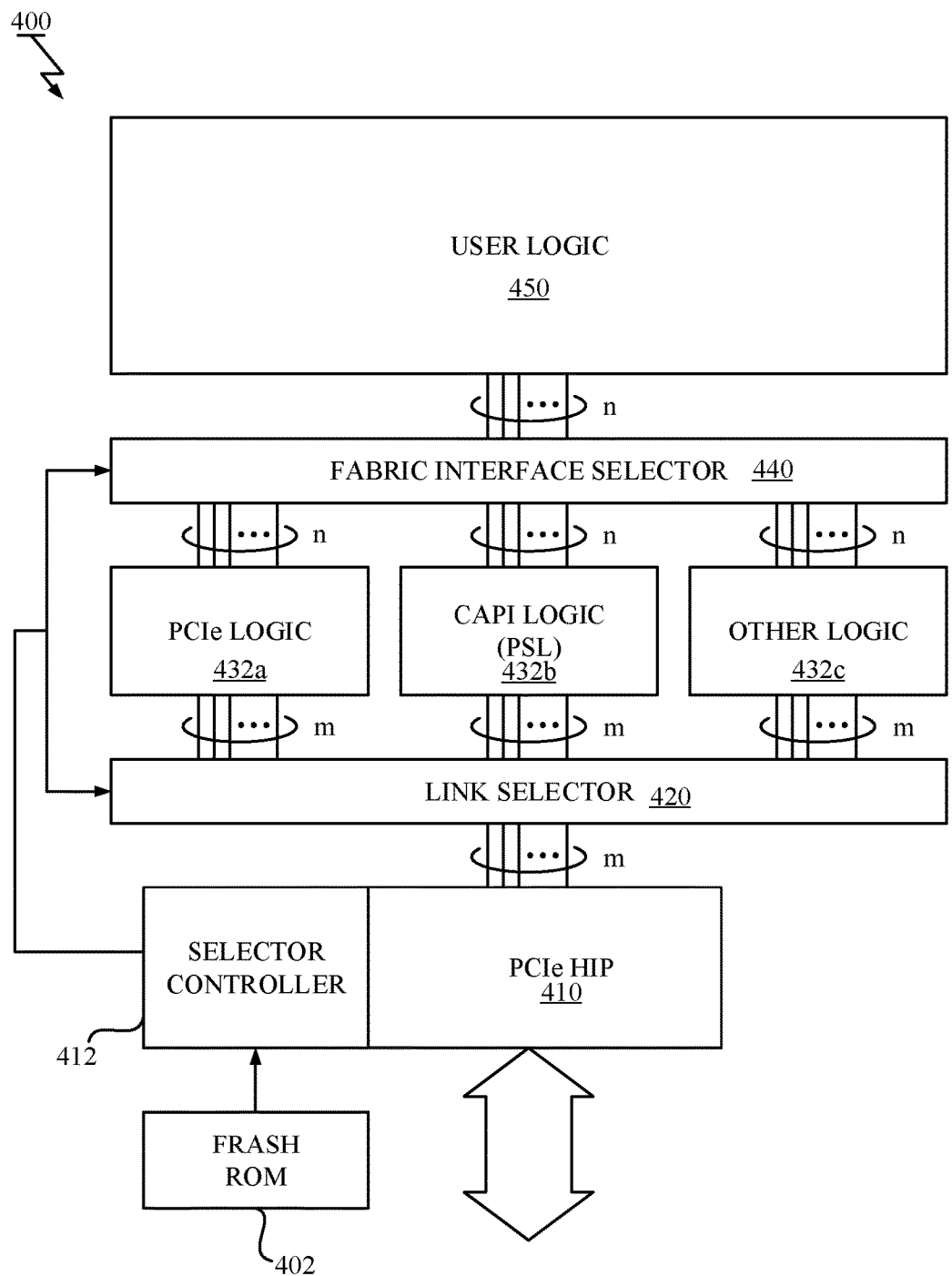
FIG. 6 illustrates a block diagram of logic circuits on the FPGA based on a novel board support package according to other embodiment of the present invention.

Referring to FIG. 6, a block diagram of a logic circuit 400 on the FPGA based on a novel board support package according to other embodiment is described. As shown in FIG. 6, the logic circuit 400 may include a PCIe HIP 410, a selector controller 412, a link selector 420, logic circuits 432 for PCIe, CAPI and other protocol, a fabric interface selector 440 and a user logic circuit 450, each of which has identical functionality of corresponding component shown in in FIG. 3 unless otherwise noted.

As shown in FIG. 6, a flash ROM 402 is allocated to the selector controller 412. In one or more embodiments, an existing ROM sector can be allocated as the flash ROM 402 or a small dedicated ROM device can be added. In the embodiment, the PCIe HIP 410 includes a register that holds a value of a setting parameter. The value of the setting parameter is loaded from a non-volatile memory such as the flash ROM 402 in starting or restarting the accelerator board 110.

According to the embodiment shown in FIG. 6, the setting parameter for the selector controller 412 can be set in offline mode, which eases concerns about stability on the accelerator board 110.

Figure 7:
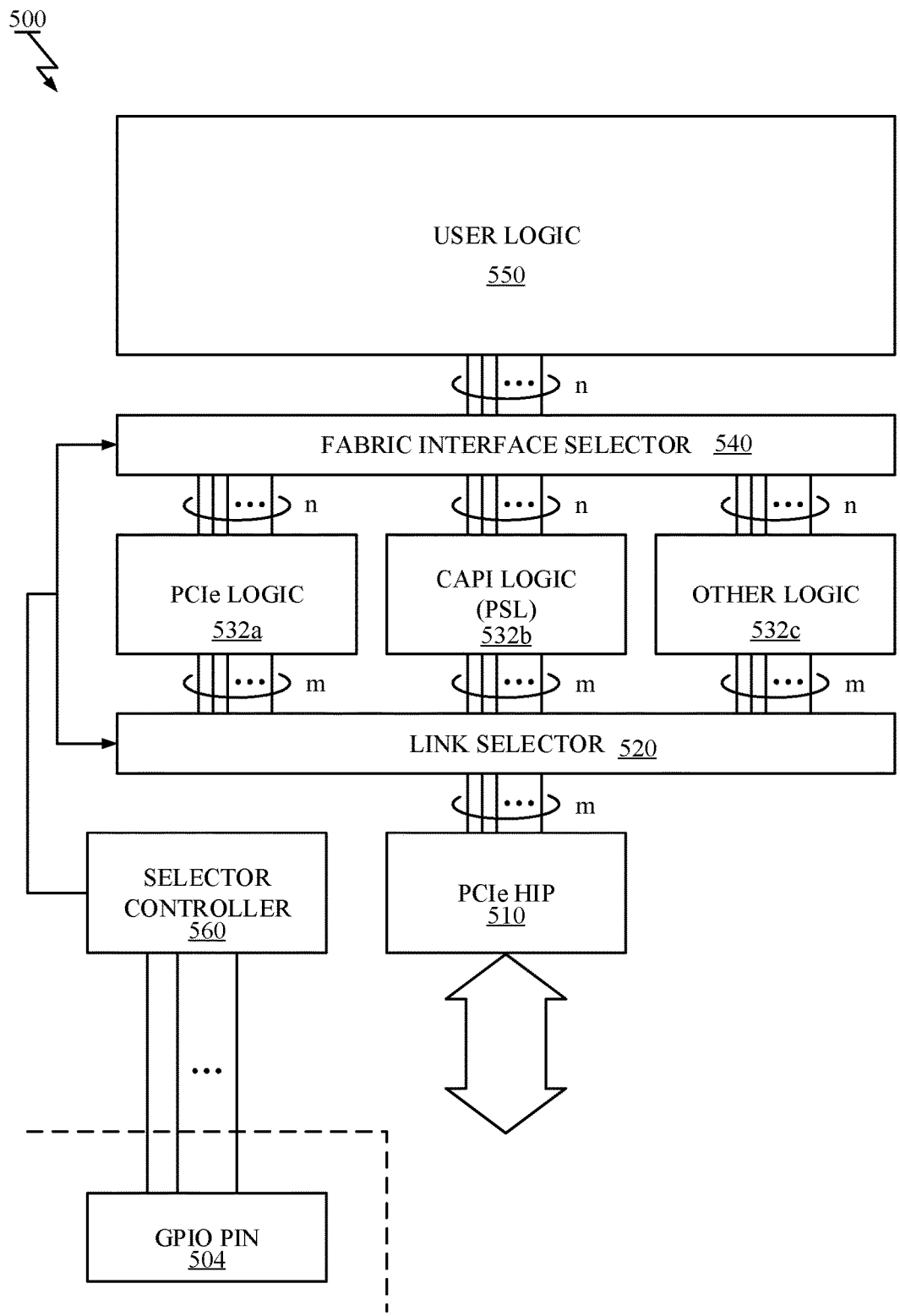
FIG. 7 illustrates a block diagram of logic circuits on the FPGA based on a novel board support package according to further other embodiment of the present invention.

FIG. 7 illustrates a block diagram of a logic circuit on the FPGA based on a novel board support package according to further other embodiment. As shown in FIG. 7, the logic circuit 500 may include, similar to the logic circuit 200 shown in FIG. 3, a PCIe HIP 510, a link selector 520, logic circuits 532 for PCIe, CAPI and other protocol, a fabric interface selector 540 and a user logic circuit 550 and a selector controller 560, each of which has identical functionality of corresponding component shown in in FIG. 3 unless otherwise noted. In this embodiment, the selector controller 560 is not attached to the PCIe HIP 516 as shown in FIG. 7.

On the accelerator board 110, there is a General Purpose Input/Output (GPIO) pin 504 including one or more external terminals connected to the selector controller 560. A setting parameter for the selector controller 560 may be configured by a state of the one or more external terminals through the GPIO without using CvP. Before changing pin settings, it is necessary to power off the accelerator board 110, however, the layout shown in FIG. 7 can be applicable when the PCIe HIP 510 are not provided with a function such as CvP.

Figure 8:
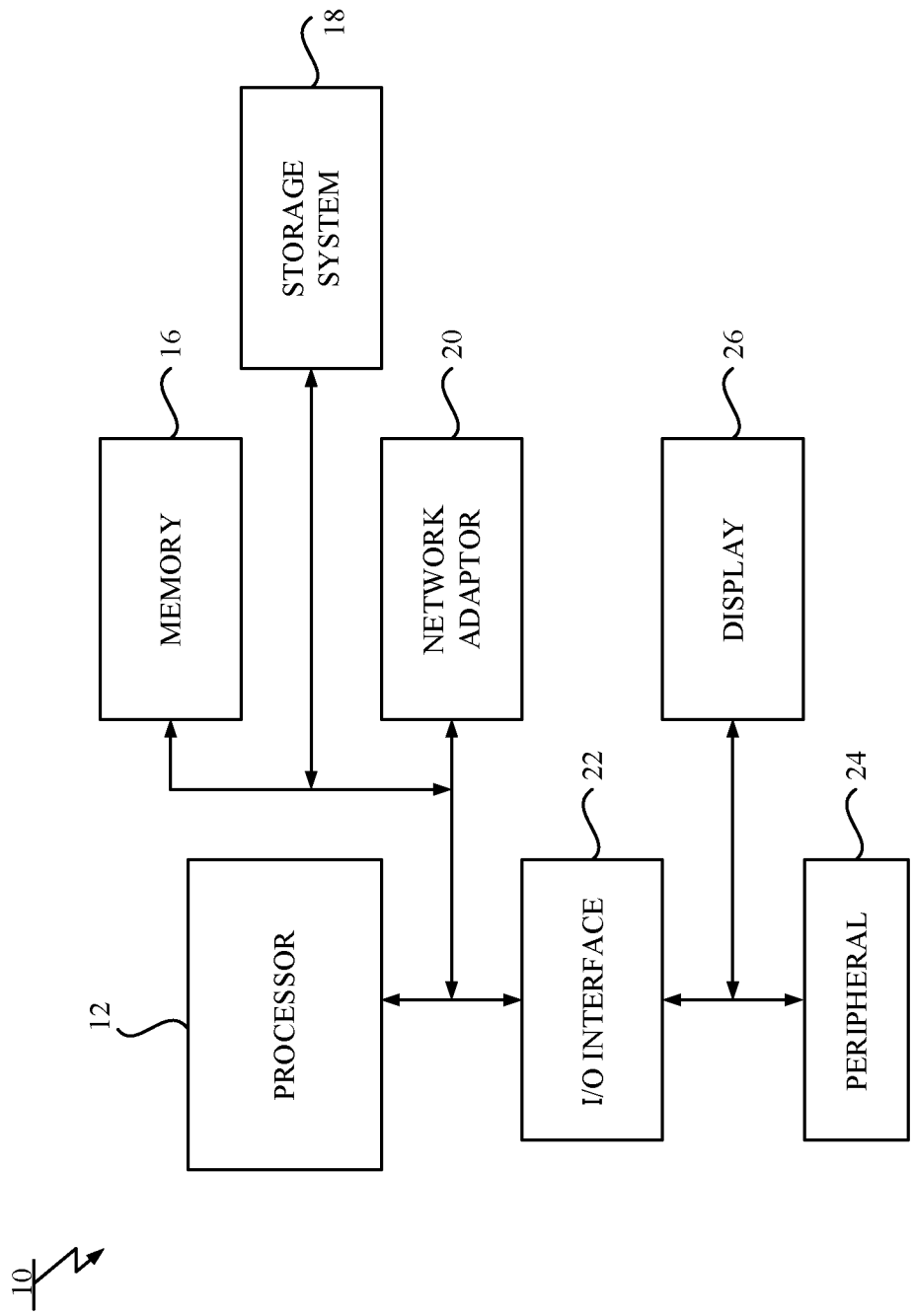
FIG. 8 depicts a schematic of an example of the computer system according to one or more embodiment of the present invention.

Referring now to FIG. 8, a schematic of an example of aforementioned computer system for developing the accelerator board 110 or other example of the host computer is shown. The computer system 10 shown in FIG. 8 is only one example of a suitable processing device and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, handheld or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 8, the computer system 10 is shown in the form of a general-purpose computing device. The components of the computer system 10 may include, but are not limited to, a processor (or processing unit) 12 and a memory 16 coupled to the processor 12 by a bus including a memory bus or memory controller, and a processor or local bus using any of a variety of bus architectures.

The computer system 10 typically includes a variety of computer system readable media. Such media may be any available media that is accessible by the computer system 10, and it includes both volatile and non-volatile media, removable and non-removable media.

The memory 16 can include computer system readable media in the form of volatile memory, such as random access memory (RAM). The computer system 10 may further include other removable/non-removable, volatile/non-volatile computer system storage media. By way of example only, the storage system 18 can be provided for reading from and writing to a non-removable, non-volatile magnetic media. As will be further depicted and described below, the storage system 18 may include at least one program product having a set (e.g., at least one) of program modules that are configured to carry out the functions of embodiments of the invention.

Program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 10 may also communicate with one or more peripherals 24 such as a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for developing a function on a programmable apparatus, the programmable apparatus including a physical interface, the system comprising:
   a non-transitory computer readable storage medium having program instructions embodied therewith; and
   a processor communicatively coupled to the non-transitory computer readable storage medium, wherein the processor is configured to execute the program instructions to cause the processor perform a method comprising:
   reading a data structure including a peripheral logic design for a plurality of peripheral logic circuits and a selector design for a selector circuit on the programmable apparatus, wherein:
      the plurality of the peripheral logic circuits are configured to share a hardware intellectual property block connected to the physical interface in the programmable apparatus,
      the hardware intellectual property block includes a register holding a value of the predetermined setting parameter, and the value of the predetermined setting parameter is configurable via the physical interface and by a non-volatile memory in starting or restarting the programmable apparatus;
   reading a code of high level language, the code describing the function; and
   passing the code and the data structure to a compiler to generate configuration data representing designs and internal states of elements in the programmable apparatus, the programmable apparatus being configured by the configuration data to have the plurality of the peripheral logic circuits, the selector circuit and a function logic circuit for executing the function, each peripheral logic circuit being configured to connect the function logic circuit with the physical interface using a respective protocol, the selector circuit being configured to select one peripheral logic circuit from among the plurality of the peripheral logic circuits to activate,
   wherein the selector design comprises:
      a first selector design for a first selector, the first selector being configured to connect the physical interface with one of the plurality of peripheral logic circuits,
      a second selector design for a second selector, the second selector being configured to connect the function logic circuit with one of the plurality peripheral logic circuits, and
      a selector controller design for a selector controller, the selector controller being configured to control states of the first and second selectors based on a predetermined setting parameter, and
   wherein the compiler is OpenCL kernel compiler, the programmable apparatus is a circuit board including a Field Programmable Gate Array (FPGA), and the function logic circuit implements a kernel corresponding to a host application on a host computer, the function logic circuit, the plurality of the peripheral logic circuits and the selector circuit being implemented at least in part by using logic blocks of the FPGA.

* * * * *